United States Patent Office 3,338,919
Patented Aug. 29, 1967

3,338,919
PROCESS FOR PRODUCING ACID IMIDE DERIVATIVES
Eric Nield, Stevenage, England, assignor to Imperial Chemical Industries Limited, London, England, a corporation of Great Britain
No Drawing. Filed Oct. 19, 1964, Ser. No. 404,968
Claims priority, application Great Britain, Oct. 25, 1963, 42,231/63, 42,232/63
5 Claims. (Cl. 260—326.5)

The present invention relates to the cyclisation of $\alpha,\beta$-amic acids and their mono N-substituted derivatives to yield imides, and more particularly to the cyclisation of the amic acid derivatives of $\alpha,\beta$-ethylenically unsaturated cis-$\alpha,\beta$-dicarboxylic acids with the loss of a molecule of water to yield imides of $\alpha,\beta$-ethylenically unsaturated $\alpha,\beta$-dicarboxylic acids.

$\alpha,\beta$-amic acids and their mono N-substituted derivatives which are capable of cyclisation to imides with the loss of a molecule of water are compounds which have (i) a carboxy group and (ii) either a primary carbamoyl or a secondary carbamoyl group, attached to vicinal carbon atoms. Alternatively, they may be regarded as 3-carboxy derivatives of primary or secondary amides. The cyclisation of such compounds to form imides is well known and the reaction is generally effected simply by heating or by vacuum distillation. However, if the conditions normally used for cyclisation are applied to those compounds in which the vicinal carbon atoms are linked by a double bond (that is, $\alpha,\beta$-ethylenically unsaturated cis-$\alpha,\beta$-amic acids and their mono N-substituted derivatives, which can be regarded alternatively as the 3-carboxy derivatives of 2,3-ethylenically unsaturated primary or secondary amides), the yields of imide are impaired because of secondary reactions involving the double bond. Efforts to avoid such secondary reactions have led to cyclisation processes under less forcing conditions and in the presence of compounds known to react with water. For example, the cyclisation of N-substituted maleamic acids has been effected in the presence of such dehydrating agents as dicyclohexylcarbodiimde and acetic anhydride. These processes require the presence of the dehydrating agent in an amount at least equimolar with the amic acid and it is frequently preferred to use up to four moles or more of the dehydrating agent per mole of amic acid. The processes are therefore clumsy and expensive to operate.

It is an object of the present invention to provide a process for the cyclisation of $\alpha,\beta$-ethylenically unsaturated cis-$\alpha,\beta$-amic acids and their mono N-substituted derivatives which avoids the use of large quantities of dehydrating agent.

Accordingly, I provide a process for the cyclisation of an $\alpha,\beta$-ethylenically unsaturated cis-$\alpha,\beta$-amic acid which is free of atomic groups which are basic in character, or a mono N-substituted derivative thereof in which the substituent is non-basic in character and is linked to the nitrogen atom through a carbon atom, in which it is contacted at a temperature of from 80° C. to 200° C. with from 0.01 to 20% with 0.01 to 20% by weight of the total amount of the amic acid employed of an acidic catalyst selected from sulphur trioxide, sulphuric acid, chlorosulphonic acid, polyphosphoric acids, pyrophosphoric acid, phosphorus acids having the structure HOPO, $HOPO_2$, $(HO)_3P$, $(HO)_3PO$, $HP(OH)_2$, $HPO(OH)_2$, $H_2POH$ and $H_2PO.OH$, organic sulphonic acids and organo-phosphorus acids. By the term "organo-phosphorus acids" I mean acids having the structure $HP(OH)_2$ or $HPO(OH)_2$, in which the hydrogen atom bound to the phosphorus atom has been replaced by a monovalent organic radical (i.e., organo-phosphonous acids and organo-phosphonic acids) and acids having the structure $H_2POH$ or $H_2PO.H$ in which at least one of the hydrogen atoms bound to the phosphorus atom has been replaced by a monovalent organic radical (i.e., organo-phosphinous and organo-phosphinic acids).

By an atomic group which is basic in character I mean one which is a proton acceptor according to Bronsted (e.g., an amino group) and, conversely, by a substituent which is non-basic in character I mean one that is not a proton acceptor according to Bronsted.

THE AMIC ACIDS AND THEIR DERIVATIVES

The part of an $\alpha,\beta$-ethylenically unsaturated cis-$\alpha,\beta$-amic acid which is active in the cyclisation reaction has the structure

(1)

The nature of the groups satisfying the remaining two valencies on the carbon atoms is immaterial to the success of the cyclisation reaction provided it does not destroy the catalyst but it may affect the rate of cyclisation, e.g. by causing steric hindrance or by reducing or increasing the reactivity of the amido hydrogen atoms or the carboxylic hydroxyl group. Thus, while the invention is applicable in general to all $\alpha,\beta$-ethylenically unsaturated cis-$\alpha,\beta$-amic acids which are free of atomic groups which are basic in character, the better results are obtained generally from those in which the atoms or groups which satisfy the remaining valencies are limited to hydrogen atoms, halogen atoms (e.g., fluorine, chlorine, bromine, iodine) and alkyl groups containing from 1 to 4 carbon atoms (methyl, ethyl, propyl, isopropyl, butyl, isobutyl and t-butyl). The simplest member of the class of $\alpha,\beta$-ethylenically unsaturated cis-$\alpha,\beta$-amic acids is maleamic acids ($H_2NOC.CH=CH.COOH$) and this and its N-substituted derivatives are used throughout the specification to illustrate the process of my invention. However, it should be understood that the process of this invention is not limited to the cyclisation of such compounds alone but, as stated hereinbefore, is applicable in general to any amic acid which contains the structure (1) and is free of groups which are basic in character and to any of its N-substituted derivatives in which the substituent is non-basic in character.

It appears that the cyclisation of the amic acid or its mono N-substituted derivative involves the combination of an amido hydrogen atom with the hydroxyl group of the carboxylic acid group which together split off to form a molecule of water and the linking of the carboxylic carbon atom to the amido nitrogen atom to yield an imide. The nature of the substituent of the mono N-substituted amic acid may affect the rate of reaction or may promote competitive secondary reactions but it is immaterial to the success of the cyclisation so long as it does not destroy the acidic compound catalysing the reaction. Thus, any substituent which is non-basic in character may be tolerated. Examples are:

(1) Monovalent aliphatic groups such as alkyl, cyclo-alkyl and alkenyl, e.g., methyl, ethyl, n-propyl, isopropyl, n-butyl, isobutyl, n-hexyl, cyclohexyl, n-octyl, 2-ethylhexyl, n-decyl, n-dodecyl, n-octadecyl, eicosyl and allyl;

(2) Substituted derivatives of monovalent aliphatic groups such as chloromethyl, bromomethyl, 4-chlorobutyl, cyanoethyl, esters of hydroxymethyl such as the acetate, propionate, benzoate, n-butyrate and monoester of succinic acid, hydroxyethyl and esters thereof such as the half ester of succinic acid, benzyl, o-chlorophenoxyethyl, 2-ethoxyethyl, 2-thiomethylethyl, phenylethyl, phenoxyethyl, p-nitrophenoxyethyl, 2-nitrocyclohexylmethyl, 3,5-di-t-butyl-4-hydroxycyclohexylmethyl, and derivatives having the structure $$-CH_2O.CO.CH=CHCH_3, -CH_2OCH_2CH=CH_2$$

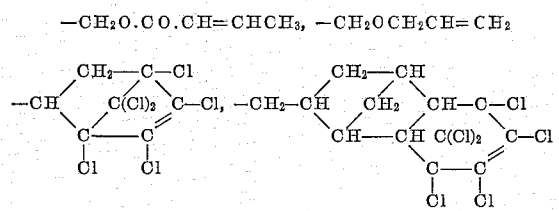

and

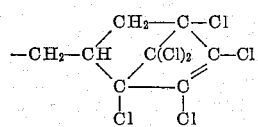

(3) Monovalent aryl and alkaryl radicals, e.g., phenyl, o-tolyl, m-tolyl, p-tolyl, o-biphenylyl, p-biphenylyl, p-(t-butyl)phenyl, p-dodecylphenyl, o-vinylphenyl, 2,4-dimethylphenyl, 2,6-dimethylphenyl, 4-cyclohexylphenyl, α-naphthyl, β-naphthyl, 1-fluorenyl, 2-fluorenyl, 3-fluorenyl and 4-fluorenyl and (4) Substituted derivatives of monovalent aryl and alkaryl radicals, e.g., m-chlorophenyl, o-chlorophenyl, p-chlorophenyl, p-acetamidophenyl, o-methoxyphenyl, p-methoxyphenyl, p-ethoxyphenyl, o-nitrophenyl, m-nitrophenyl, p-nitrophenyl, o-hydroxyphenyl, p-hydroxyphenyl, p-acetoxyphenyl, p-carboxyphenyl, p-sulphophenyl, p-acetylphenyl, 2,5-dichlorophenyl, 2,5-dimethoxyphenyl, 2,4-dinitrophenyl, 3,5-dinitrophenyl, 2-nitro-4-chlorophenyl, 2-nitro-4-ethoxyphenyl, 3-nitro-4-methylphenyl, 2-methyl-5-nitrophenyl, 2-methyl-4-chlorophenyl, 2-methoxy-5-chlorophenyl, 2-methoxy-5-nitrophenyl, 4-phenoxyphenyl, 4-phenylcarboxyphenyl, 4-phenylsulphodioxyphenyl, 4-(o-chlorophenoxy)phenyl, 2,4,5-trichlorophenyl, 1-(9-oxofluorenyl), 2-(7-bromofluorenyl), 2-(bromofluorenyl), 2-(7-fluorofluorenyl), 2-(7-nitrofluorenyl), 2-(3-bromo-9-oxofluorenyl), 2-(9-acetoxyfluorenyl), 2-(9-oxofluorenyl), 3-(9-oxofluorenyl), and 4-(9-oxofluorenyl).

However, the substituent on the amido nitrogen atom may affect the ease with which cyclisation is accomplished, e.g., by steric hindrance or by activation or de-activation of the amido hydrogen atom or may encourage secondary reactions and I prefer the N-substituted amic acids in which the substituent contains not more than 14 carbon atoms in all and is a saturated monovalent hydrocarbon group (e.g., alkyl, cycloalkyl, aralkyl, aryl or alkaryl) or a substituted derivative thereof in which the aliphatic hydrogen atoms may be replaced only by halogen atoms or groups of the structure —CN, —OH and —OQ and/or the aromatic hydrogen atoms may be replaced only by halogen atoms or monovalent groups having the structure —NO₂, —OH, —OQ, —CN, —SQ, —COQ, —SO₂Q, —COOQ, —COOH and —OCOQ, where Q is a monovalent hydrocarbon radical or a derivative thereof in which the aliphatic hydrogen atoms may be replaced only by halogen atoms and/or the aromatic hydrogen atoms may be replaced only by halogen atoms or nitro groups.

It will be appreciated that with some mono N-substituted amic acids, the nature of the substituent may be modified during the cyclisation reaction so that the imide obtained is not the exact counterpart of the acid from which it was derived. For example, the substituent may contain an acid-labile group which is lost or modified during the cyclisation.

THE CATALYSTS

Where sulphur trioxide is the chosen catalyst, it may be used alone or admixed with an organic solvent, particularly a normally liquid aromatic hydrocarbon such as benzene, toluene or a xylene.

Any organic sulphonic or organo-phosphorus acid may be used as a catalyst for our cyclisation process. The organic sulphonic acids have the structure RSO₃H and the organo-phosphorus acids have the structure RP(OH)₂, RPO.(OH)₂, HRPOH, RR'POH, HRPO.OH or

RR'PO.OH where R and R' are monovalent organic radicals. They are linked by a carbon atom to the sulphur or phosphorus atom respectively. Examples of such organic sulphonic acids and organo-phosphorus acids may be found on pages 465 to 492 of "Pure and Applied Chemistry," volume 1, 1960–61.

I have found in general that the activity of the organic acid in promoting my cyclisation reaction is directly related to its acidity; that is, efficiency has been found to vary inversely with $pK_a$ value although this may not apply for very low $pK_a$ values, when reactions involving the double bond may occur to an increasing extent. Therefore, I prefer on the whole to use acids that are incapable of existing as switter ions, thus excluding acids having basic nitrogen atoms such as aminoalkyl-, aminoaryl-, pyridine- and quinoline-sulphonic acids and their organo-phosphorus equivalents.

Organic sulphonic and organo-phosphorus acids that are particularly effective are generally found amongst those in which R and R' are each selected from alkyl or cycloalkyl radicals containing up to about eight carbons (preferably unbranched) or derivatives thereof in which the only substituents are halogen atoms, hydroxyl groups or $C_{1-4}$ alkoxy groups or aryl, aralkyl, alkaryl or quinone groups having up to 14 carbon atoms or substituted derivatives thereof in which the only substituents (if any) for the aliphatically bound hydrogen atoms are halogen atoms, hydroxyl groups or $C_{1-4}$ alkoxy groups and the only substituents (if any) for the aromatically bound hydrogen atoms are halogen atoms (particularly fluorine and chlorine atoms) and groups having the structure —OH, —NO₂, —CN, —SH, SR", OR", —CHO, COR", —SO₂R", —CF₃, CCl₃, or —COOH where R" is a monovalent (i.e., alkyl, cycloalkyl, aryl, aralkyl or alkaryl) hydrocarbon radical. In general, R and R' each contain not more than 16 carbon atoms.

Particular examples of such acids are alkyl (including cyclo-alkyl) sulphonic acids (e.g., methyl, ethyl, propyl, n-butyl, n-hexyl, cyclohexyl and methylcyclohexyl sulphonic acids); aryl sulphonic acids (e.g., benzene, naphthalene, anthracene, phenanthrene, pyrene and fluorene sulphonic acids); alkaryl sulphonic acids such as p-toluene sulphonic acid, aralkyl sulphonic acids such as benzyl sulphonic acid and sulphonic acid derivatives of substituted hydrocarbons such as m- and p-hydroxyphenyl sulphonic acids, anthraquinone-1-sulphonic acid, anthraquinone-2-sulphonic acid, alizarin-3-sulphonic acid and chloromethyl sulphonic acid; methyl, ethyl, n-propyl, isopropyl, n-butyl, n-butyl-2-, isobutyl, t-butyl, neopentyl, t-amyl, n-hexyl, chloromethyl, dichloromethyl, trichloromethyl, bromomethyl, iodomethyl, hydroxymethyl, phenyl, o-tolyl, m-tolyl, p-tolyl, o-fluorophenyl, o-, m- and p-chlorophenyl, o-, m- and p-bromophenyl, o-iodophenyl, m-hydroxyphenyl, p-hydroxyphenyl, o- and p-methoxyphenyl, p-ethoxyphenyl, m- and p-nitrophenyl, 2-bromo-p-tolyl, benzoic acid-2-, benzoic acid-3-, benzoic acid-4-, 3-chlor-4- methoxyphenyl, 2-chlor-4-nitrophenyl, 2-hydroxy-4-nitrophenyl and 2-methoxy-4-nitrophenyl phosphonic acids; methyl, ethyl, n-propyl, isopropyl, n-butyl, phenyl, p-bromophenyl and p-methoxyphenyl phosphinic acids; dimethyl and diphenyl phosphinic acids and their phosphonous and phosphinous acid equivalents. In general, I have found that the organo-phosphorus acids may be less likely than their organo-sulphonic acid equivalents to promote secondary reactions involving the double bond of the amic acid.

I prefer the catalyst to be substantially involatile at the temperature of the reaction (generally from 80° C. to 160° C.) and examples of these may be established with reference to standard handbooks on the physical constants of organic compounds or by experiment. Particular examples are sulphuric acid, and aromatic sulphonic, aromatic phosphonic and aromatic phosphinic acids in general.

The use of less than 0.01% of catalyst (based on the weight of amic acid or derivative) generally has an insignificant effect on the reaction but the use of more than 20% is uneconomical. In the preferred process, which takes place with the amic acid or its derivative dissolved or dispersed in an inert organic diluent, satisfactory results are obtained with the use of catalyst amounts equivalent to 0.1 to 5% by weight of the diluent.

Where the catalyst is sulphur trioxide, sulphuric acid or an organic sulphonic acid, I have found that its activity may be increased by the addition of an aliphatic alcohol generally in an amount of up to about ten times the weight of the acid catalyst. The effectiveness of the alcohol is in general proportional to the readiness with which it may be esterified and therefore I prefer those having the hydroxyl group on a carbon atom having a chain of no more than three carbon atoms attached thereto, e.g. methanol, ethanol, n-propanol, isopropanol, isobutanol, t-butanol and 1,1-diethylethanol.

THE PROCESS

The process may be effected simply by heating the amic acid or the N-substituted derivative with the catalyst to a temperature of from 80° C. to 200° C. Below 80° C., the reaction is uneconomically slow even with the use of very efficient catalysts and above 200° C., the cyclisation is shadowed by undesirable secondary reactions. However, cyclisation in the absence of a diluent frequently leads to local overheating and undesirable resin formation which is particularly noticeable in the case of the N-substituted derivatives of maleamic acid. Therefore, according to a preferred embodiment of the invention, the reaction is effected with the amic acid or the N-substituted derivative dissolved or suspended in an inert diluent, most preferably under reflux. This process is particularly suitable when the diluent is that used in the prior formation of the amic acid or the N-substituted derivative by reacting the corresponding anhydride in solution with ammonia or a primary amine, since it obviates the need for separating and purifying the product of that reaction. Very good results are obtained if a diluent having a boiling point above 80° C. is used and the water formed on cyclisation is removed by distillation with the diluent.

Any inert organic diluent having a boiling point above 80° C. may be used and by an inert diluent I mean one which has no noticeably adverse effect upon the reaction. Examples are benzene, toluene, the xylenes, sinarol, petroleum fractions boiling in the range 100 to 180° C., petroleum ether 100°–120°, petroleum ether 120°–160°, chlorobenzene, di-n-butyl ether, methyl isobutyl ketone, tetrachlorethane and benzene/toluene mixtures. In general, the process increases in efficiency with increase in boiling point of the diluent but insoluble by-products tend to be produced in increasing yields at the higher temperatures and therefore diluents having a boiling point of less than 200° C., preferably less than 180° C. should be used. The ultimate choice of diluent depends to some extent upon the nature of the amic acid or the N-substituted derivative since the optimum temperature for the cyclisation reaction varies from compound to compound. The best reaction conditions for cyclising a given compound may be found by simple experiment.

The amount of diluent chosen depends to some extent upon its nature but on the whole the use of an amount less in weight than the weight of amic acid or N-substituted derivative should be avoided because little advantage is gained over the process operated in the absence of diluent. On the other hand, large excesses of diluent should be avoided for economic reasons. On the whole, very suitable amounts range from 2 to 5 times the weight of the amic acid or N-substituted derivative.

In a preferred process, a diluent is chosen which is immiscible with water and the distillate is separated into aqueous and non-aqueous phases, the latter being recycled to the reaction vessel if desired. This variant of the process reduces the consumption of expensive diluent and, quite unexpectedly, frequently leads to higher yields of imide.

In a particularly preferred process, only part of the amic acid or its derivative is added at the start of the reaction, the remainder being added continuously or in portions during the course of the reaction. This also results in improved yields of imide.

At the end of the reaction, the imide or N-substituted imide formed by cyclisation may be recovered by any suitable process, such as crystallisation, precipitation or distillation. It may then be purified, for instance by washing and crystallisation from a suitable solvent or by fractional distillation.

As has been stated above, the invention is particularly applicable to the prepartion of N-substituted maleimides. These compounds, and particularly the N-aryl maleimides, are useful in the manufacture of thermoplastic materials. When it is the intention to form these compounds, it may be preferred to effect the reaction in the presence of a free radical inhibitor in order to ensure that little or no resin formation occurs. Suitable inhibitors are copper salts such as cuprous chloride.

The invention is illustrated by the following examples.

Examples 1 to 16

Fifty parts of N-o-chlorophenyl maleamic acid and 215 parts of xylene were heated and stirred under reflux in a Dean-Stark distillation apparatus for 6½ hours. At the end of this period, one part (about 25% of theoretical) of water had collected. The hot mixture was filtered and excess 40–60 petroleum ether added to the cooled filtrate. The precipitate was found to contain a very small amount of N-o-chlorophenyl maleimide and a large proportion of unreacted N-o-chlorophenyl maleamic acid.

The process of Example 1 was then repeated a number of times using in each case 25 parts of N-o-chlorophenyl maleamic acid in a selected diluent. Each process was aided by the presence of a catalyst identified in the table below which also shows the duration of the reaction and the yield of water. After heating, the mixture was filtered to remove the insoluble by-products and then excess 40–60 petroleum ether was added to the cooled filtrate. The precipitate so formed was removed, washed and dried to yield the imide.

The yield, melting point and purity of N-o-chlorophenyl maleimide are tabulated below. (Pure N-o-chlorophenyl maleimide has a melting point of 74–75° C.).

In the table:

Diluent 1 is toluene (108 parts)
Diluent 2 is xylene (108 parts)
Diluent 3 is chlorobenzene (125 parts)
Diluent 4 is toluene/benzene mixture, boiling point 99° C. (110 parts)
Diluent 5 is toluene/benzene mixtlure, boiling point 91° C. (110 parts).

| Ex. | Diluent | Catalyst and amount | Reaction duration, hrs. | Yield of water (parts) | Yield of by-product (parts) | N-o-chlorophenyl maleimide ||| 
|---|---|---|---|---|---|---|---|---|
| | | | | | | Yield (parts) | M.P., °C. | Impurities, percent |
| 2 | 1 | p-Toluene sulphonic acid 2 parts | 1 | 1.5 | 3.5 | 17.6 | 65-67 | 15 |
| 3 | 1 | p-Toluene sulphonic acid 1 part | 2 | 1.5 | 4.7 | 18.1 | 62-65 | 5 |
| 4 | 2 | ___do___ | 1 | 1.5 | 4.6 | 16 | 63-65 | 5 |
| 5 | 3 | ___do___ | 1½ | 1.3 | 3.3 | 18.4 | 62-63 | 10-20 |
| 6 | 4 | ___do___ | 2½ | 1.5 | 5.6 | 16.7 | 62-65.6 | <5 |
| 7 | 5 | ___do___ | 7¾ | 1.25 | 6.4 | 15.5 | 62-65.5 | <5 |
| 8 | 1 | p-Toluene sulphonic acid 1 part, butanol 4 parts | 2¾ | 1.7 | 3.3 | 18.1 | 58.5-60 | (¹) |
| 9 | 1 | p-Toluene sulphonic acid 1 part, ethanol 3.95 parts | 6 | (¹) | 1.0 | 21.4 | 61-63 | 5 |
| 10 | 1 | Benzene phosphonic acid 1 part | 3 | 1.5 | 2.6 | 15 | | 15 |
| 11 | 2 | ___do___ | 2¼ | 1.3 | 2.7 | 17 | | 15 |
| 12 | 1 | Methyl p-toluene sulphonate 1 part | 6¾ | 1.5 | 3.6 | 19 | 52-55 | (¹) |
| 13 | 1 | Conc. sulphuric acid 1 part | 2 | 1.5 | 4.5 | 15.2 | 63-65 | 5 |
| 14 | 1 | Conc. sulphuric acid 1 part, ethanol 11.8 parts | 9½ | (¹) | 2.5 | 20.7 | 52-55 | 5-10 |
| 15 | 1 | Sulphur trioxide 1 part | 2¾ | 1.6 | 2.5 | 19 | 67.5-69 | 5 |
| 16 | 1 | β-Naphthalene sulphonic acid 1 part | 2¼ | 1.2 | 7.5 | 14.9 | 60-63 | 15 |

¹ Not measured.
NOTE: The impurity level was estimated by examination of the infrared spectrum.

Comparison of Examples 3 and 4 with Examples 10 and 11 illustrates the advantage of using the phosphorus acids in order to reduce the yield if insoluble by-product.

*Example 17*

63.7 parts of o-chloroaniline were added dropwise to a stirred solution of 49 parts of maleic anhydride in 216 parts of toluene and the mixture was stirred for 16 hours. Two parts of p-toluene sulphonic acid were then added and the mixture was stirred and refluxed for two hours in a Dean-Stark apparatus. At the end of that period 8 parts (about 90% of the theoretical amount) of water had collected. Seventeen parts of material insoluble in toluene were removed by filtration and excess 40-60° petroleum ether was added to the filtrate. The precipitated solid was found to be 90 parts of slightly impure N-o-chlorophenyl maleimide, having a melting point of 55-56° C. The impure product was dissolved in benzene and the solution percolated through alumina to yield 84 parts of a product having a melting point of 65.5-66.5° C.

Similar results may be obtained from N-o-bromophenyl maleamic acid and N-p-fluorophenyl maleamic acid.

*Example 18*

25 parts of N-o-nitrophenyl maleamic acid and 108 parts of toluene were heated with reflux and stirred in a Dean-Stark apparatus for four hours together with one part of p-toluene sulphonic acid. At the end of this period 1.7 parts of water had been collected. Excess 60-80° petroleum ether was added to the mixture and the precipitated crude N-o-nitrophenyl maleimide was filtered off, washed with a saturated solution of sodium bicarbonate and dried in vacuo. The dried product was dissolved in benzene, percolated through alumina and precipitated again into petrol to yield 11.1 parts of N-o-nitrophenyl maleimide having a melting point of 131-132° C.

Similar results may be obtained from N-m-nitrophenyl and N-p-nitrophenyl maleamic acids.

*Example 19*

The preparative process of Example 18 was repeated using 25 parts of N-phenyl maleamic acid, 108 parts of xylene and one part of p-toluene sulphonic acid. The heating was maintained for five hours after which time two parts of water had been collected. The yield after removal of insoluble by-products, precipitation into 60-80° petrol, filtration, cooling and drying was 12.6 parts of N-phenyl maleimide having a melting point of 88° C.

Similar results may be obtained from N-α-naphthyl, N-β-naphthyl, N-1-fluorenyl and N-4-fluorenyl maleamic acids, N-phenyl-2-chloromaleamic acid and N-phenyl citraconamic acid.

*Example 20*

The process of Example 19 was repeated using 125 parts of chlorobenzene in place of the xylene. The heating this time was maintained for seven hours and the yield was 15.5 parts of slightly impure N-phenyl maleimide having a melting point of 86.5° C.

*Example 21*

One hundred parts of N-allyl maleamic acid and 430 parts of dry xylene were stirred together and heated under reflux in a Dean-Stark apparatus for five hours together with four parts of p-toluene sulphonic acid. 9.6 parts of water were collected. The xylene was then evaporated off under reduced pressure and the residue was distilled off under high vacuum to yield 29.5 parts of N-allyl maleimide having a melting point of 45° C.

*Examples 22 to 30*

A series of preparations of N-o-chlorophenyl maleimide were effected in a single step process from maleic anhydride and the amine as follows. 196 parts of maleic anhydride were dissolved in about 1700 parts of diluent in a flask. To this solution was added slowly a solution of 255 parts of o-chloroaniline in about 200 parts of diluent and the amic acid started to precipitate almost at once. The mixture was stirred gently at room temperature for about 22 hours. In Examples 22 and 23, at the end of this time the slurry of amic acid was treated with 16 parts of the chosen catalyst for the cyclisation reaction and this slurry was then added slowly to a refluxing solution of a further 16 parts of the catalyst in the solvent chosen for the amic acid formation process in a Dean-Stark distillation apparatus. In Examples 24 to 30, all the catalyst was added to the slurry of amic acid and the whole was refluxed in a Dean-Stark distillation apparatus. In Example 30, by way of comparison, no catalyst was used. At the end of the reaction (as gauged by observation of the amount of water formed) the reaction mixture was cooled, filtered to remove insoluble by-products and stirred with sodium bicarbonate to remove any acid residues. It was then refiltered, the solvent evaporated under vacuum and the residue distilled off under vacuum to obtain the pure imide.

The conditions and results of each preparation are tabulated below.

| Ex. | Diluent | Catalyst | Distillation time, hours | Yield (percent of theoretical) |
|---|---|---|---|---|
| 22 | Xylene | 65% fuming sulphuric acid | 6 | 66.8 |
| 23 | ___do___ | Chlorosulphonic acid | 6 | 70.8 |
| 24 | ___do___ | Pyrophosphoric acid | 6¼ | 75.7 |
| 25 | ___do___ | Polyphosphoric acid | 6 | 73.2 |
| 26 | ___do___ | Benzene phosphonic acid | 6½ | ca. 70 |
| 27 | Toluene | ___do___[1] | 6 | 53.5 |
| 28 | Xylene | Benzene phosphonic acid | 6½ | ca. 70 |
| 29 | ___do___ | Orthophosphoric acid (88%) | 7 | 71.6 |
| 30 | ___do___ | None | 13 | 33 |

[1] Only 16 gms. of catalyst used.

Example 31

The process of Example 22 was repeated but the catalyst and all the amic acid were heated from the start of the cyclisation reaction, with no further addition of amic acid. The yield was only 61.9% of o-chlorophenyl maleimide and it was less pure, as indicated by a deeper yellow hue.

Examples 32 to 45

A further series of experiments were effected as follows. 196 parts of maleic anhydride were dissolved in about 1700 parts of diluent in a flask. To this solution was added slowly a solution of 255 parts of o-chloroaniline in about 200 parts of diluent and the amic acid started to precipitate almost at once. The mixture was stirred gently at room temperature for about 22 hours.

In most of the examples, the slurry of amic acid so obtained was then treated with a specified amount of acid catalyst and refluxed in a Dean-Stark distillation apparatus. In Example 43, however, the amic acid slurry was added slowly to a refluxing mixture of diluent and catalyst and in Examples 44 and 45 a mixture of the amic acid slurry and half the specified amount of catalyst was added slowly to a refluxing mixture of the remaining catalyst and diluent. The conditions and results of each experiment are tabulated below.

bicarbonate to neutralise residual acid and the benzene evaporated off. The residue was then distilled to yield 84.4 parts (46.25% of theoretical) of o-chlorophenylmaleimide.

Comparison of this example with the previous examples using a diluent indicates the high ratio of yield of insoluble material to the yield of imide that is obtained when operating in the absence of diluent.

By way of comparison, the process was repeated under identical conditions but omitting the catalyst. In this case the yield of benzene-insoluble material was 28.5 parts and the yield of imide only 51.1 parts (28.2% of theoretical).

I claim:

1. A process for the cyclisation of an amic acid selected from the group consisting of (a) $\alpha,\beta$-ethylenically unsaturated cis-$\alpha,\beta$-amic acids which are free of atomic groups which are basic in character and (b) the mono N-substituted derivatives thereof which are free of groups which are basic in character and have the N-substituent linked to the nitrogen atom by a carbon-nitrogen bond, said process comprising refluxing the amic acid in an excess of an inert organic diluent having a boiling point lying within the range 80 to 200° C. with an acidic catalyst selected from the group consisting of sulphur trioxide, sulphuric acid, chlorosulphonic acid, polyphos-

| Ex. | Diluent | Catalyst | Time (hours) | Amount Insoluble by-product (parts) | Amount of water collected (Theory equals 36 parts), parts | N-o-chlorophenyl maleimide | |
|---|---|---|---|---|---|---|---|
| | | | | | | Yield, Percent | Appearance |
| 32 | Toluene | p-Toluene sulphonic acid 21 parts | ca. 5 | 61.7 | 30 | 67.5 | Yellow. |
| 33 | ___do___ | p-Toluene sulphonic acid 16 parts | ca. 4 | 65.2 | 30 | 62.6 | Do. |
| 34 | Dry toluene | ___do___ | 3 | 64 | 27 | 67.6 | Do. |
| 35 | Xylene | ___do___ | 5 | 86.3 | 30 | 62.6 | Do. |
| 36 | Dry toluene | p-Toluene sulphonic acid 16 parts, EtOH 40 parts | 6 | 54.7 | [1] 63 | 73.6 | Do. |
| 37 [2] | ___do___ | SO₃ 16 parts | 2½ | 50.3 | 26 | 74.7 | Very pale yellow. |
| 38 | ___do___ | 65% fuming sulphuric acid 16 parts | 4½ | 85 | 30 | 73.1 | Do. |
| 39 | ___do___ | 65% fuming sulphuric acid 32 parts | 5 | ([3]) | 31 | 75 | Do. |
| 40 | ___do___ | Sulphonated toluene [4] | 4 | 77.6 | 30 | 69.4 | Do. |
| 41 | Dry trichloroethylene | Dry p-toluene sulphonic acid 16 parts | 6¾ | 101 | 26.5 | 64.8 | Do. |
| 42 | Methyl isobutyl ketone | p-Toluene sulphonic acid 16 parts | 3½ | 19.7 | 35 | 61.3 | Deep yellow. |
| 43 | Dry xylene | ___do___ | 4 | 36.7 | 35 | 74.4 | Very pale yellow. |
| 44 | Dry toluene | p-Toluene sulphonic acid 32 parts | 6¾ | 68.7 | 30 | 69.2 | Do. |
| 45 | Dry xylene | ___do___ | ca. 5½ | 39.8 | 37 | 76.7 | Do. |

[1] EtHO+H₂O.
[2] Only 400 parts of amic acid were used in the cyclisation reaction in this experiment.
[3] Not measured.
[4] Prepared by adding 16 parts of 65% fuming sulphuric acid to 86.7 parts of toluene.

Example 46

200 parts of o-chlorophenylmaleamic acid were heated with 8 parts of p-toluene sulphonic acid under an atmosphere of nitrogen and in a distillation apparatus for four hours at 150–160° C. At the end of this period, the reaction mixture was extracted with 660 parts of benzene and the insoluble material (36.4 parts) filtered off. The benzene solution was then stirred with 50 parts of sodium phoric acids, pyrophosphoric acid, phosphorus acids having the structures $HOPO$, $HOPO_2$, $(HO)_3P$, $(HO)_3PO$, $HPO(OH)_2$, $HP(OH)_2$, $H_2POH$ and $H_2PO.OH$, organic sulphonic acids and organo-phosphorus acids, the amount of the catalyst being 0.01 to 20% by weight of the total amount of the amic acid employed, and distilling off from the reaction mixture during the cyclisation process the water formed by the reaction.

2. A process according to claim 1 in which the compound to be cyclised is a mono N-substituted derivative of maleamic acid.

3. A process according to claim 1 in which the organic sulphonic acid is a benzene-sulphonic acid.

4. A process according to claim 1 in which the acidic catalyst is selected from the group consisting of sulphur trioxide, sulphuric acid, and an organic sulphonic acid together with up to ten times the catalyst weight of an alkanol having from 1 to 6 carbon atoms.

5. A process according to claim 1 in which the acidic catalyst is present in an amount of from 0.1 to 5% by weight of the diluent.

No references cited.

ALEX MAZEL, *Primary Examiner.*

JOSE TOVAR, *Assistant Examiner.*